Nov. 21, 1961 W. A. BLOCK 3,009,383
HOLLOW RIVET FOR EASILY DEFORMABLE STRUCTURES
Filed April 30, 1957
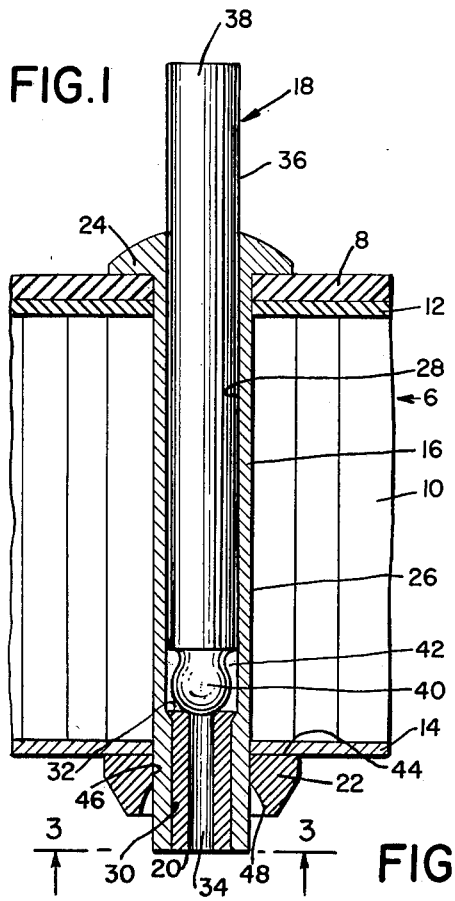
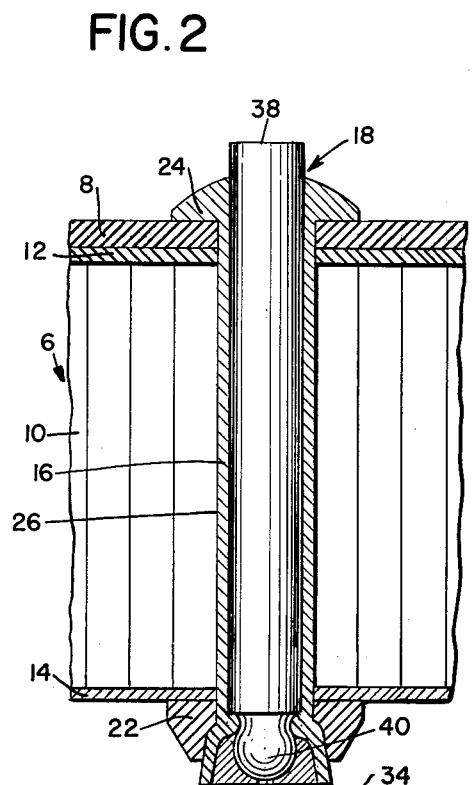
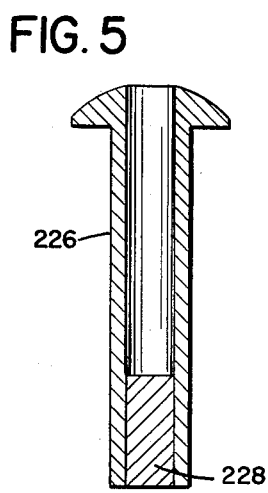
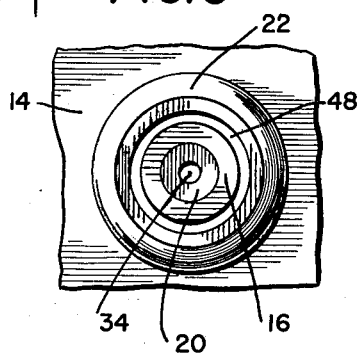
INVENTOR
WARREN A. BLOCK
Richard A. Craig
ATTORNEY 3,009,383
HOLLOW RIVET FOR EASILY DEFORMABLE STRUCTURES
Warren A. Block, 49 Circuit Road, Bellport, N.Y.
Filed Apr. 30, 1957, Ser. No. 656,000
1 Claim. (Cl. 85—40)

This invention relates generally to fastening devices and more particularly to a rivet having special utility for fastening two structural elements together where one of the elements is such that it may be easily deformed or crushed by compressive forces.

An example of such a deformable or crushable element is the so-called honeycomb sandwich panel which has found wide application, particularly in aircraft construction, because of its light weight.

Many honeycomb fasteners have been proposed, but until my invention most have been subject to the difficulty that they can not accommodate themselves to variations in built-up material thickness, even within established tolerance limits. The result has been that the use of such prior fasteners has resulted in an unacceptable deformation of the honeycomb if the thickness referred to is on the high side or a loose connection if the thickness is on the low side.

A rivet in accordance with my invention solves the problem outlined above in a manner which is both simple and sure.

It is therefore an important object of this invention to provide a honeycomb fastener which will result in acceptable connections regardless of the built-up material thickness, within tolerance limits established therefor.

It is another object to provide such a fastener in the form of a rivet.

A rivet embodying this invention includes a tubular body defining an axis and having a head at one end, an expansion member within the body and spaced a predetermined distance from the head, and a ram having an actuating end within the body and facing away from the head, and a portion extending outwardly of the body beyond the head, the expansion member being deformable by the actuating end of the ram in turn to deform the body outwardly from the axis. A collar having a recessed end may also be provided, the collar adapted to be placed on the tubular body from the end thereof remote from the head, with the recessed end facing away from the head. In that case the tubular body, after the deformation thereof referred to, conforms to the recess of the recessed end of the collar.

The above and other objects and advantages will become apparent from the following description and the accompanying drawings in which:

FIG. 1 is an elevational view, partly in section, of a rivet in accordance with this invention and including a preferred form of collar, the rivet being ready to be set to fasten together a honeycomb sandwich panel and another structural element;

FIG. 2 is a view similar to FIG. 1, but after the rivet has been set;

FIG. 3 is a view on line 3—3 of FIG. 1;

FIG. 4 is a longitudinal sectional view of modified form of collar; and

FIG. 5 is a sectional view of a modified form of rivet.

Reference is first made to FIG. 1 which shows a honey comb sandwich panel 6 and another structural element 8 which are to be fastened together.

Panel 6 includes a core section 10 of any suitable material, such as aluminum, and relatively thin parallel face sheets 12 and 14, which may also be of aluminum and which are suitably bonded to core 10. Core 10 is cellular in nature, with the cells running perpendicular to sheets 12 and 14, and from one to the other. Honeycomb 6 is such that a relatively small squeezing force applied to face sheets 12 and 14 would either deform or crush honeycomb 6. Honeycomb 6 and element 8 are provided with holes therethrough which are aligned when these parts are positioned to be fastened together, and the hole through honeycomb 6 is perpendicular to sheets 12 and 14.

Also shown in FIG. 1 is a rivet in accordance with the invention comprising a tubular body 16, a ram 18, an expansion member or dowel 20 and a collar 22.

Body 16 has a head 24 at one end and an external cylindrical surface 26 extending from head 24 to the end of body 16 remote from head 24, surface 26 being of a length greater than the combined thicknesses of honeycomb 6 and element 8 and of a diameter such that surface 26 can enter the holes through honeycomb 6 and element 8. The shape of head 24 is optional and may be flush instead of raised as shown.

Body 16 further has a hole therethrough defined by cylindrical surfaces 28 and 30 and a conical surface 32, all coaxial with surface 26. Surface 28 extends from head 24 for a portion of the length of the body 16, and surface 30 extends toward surface 28 from the end of body remote from head 24. Surface 30 is of lesser diameter than surface 28, and surfaces 28 and 30 are joined by conical surface 32.

Thus the wall of body 16 is thicker at surface 30 than at surface 28, and conical surface 32 provides an internal shoulder between surfaces 28 and 30.

Expansion dowel 20 is of generally tubular form and its axial length may be and as shown is equal to the combined axial lengths of surfaces 30 and 32. The exterior of dowel 20 may be and as shown is of a configuration conforming to surfaces 30 and 32, so that dowel 20 can be assembled as shown in the hole in body 16 at the end thereof remote from head 24. Dowel 20 also has an axial hole 34 therethrough, the purpose of which will appear shortly.

Ram 18 is of one-piece solid construction comprising a cylindrical portion 36 having a striking portion 38 at one end of portion 36 and a ball 40 at the other end of portion 36, with a relief 42 between ball 40 and cylindrical portion 36.

Collar 22 is washer-like, having a surface 44 at one end and an axial hole therethrough and having a cylindrical portion 46 which extends from surface 44 for roughly half the axial length of collar 22 and a non-cylindrical portion 48 which extends from portion 46 for the remainder of the axial length of collar 22. The diameter of portion 46 is marginally greater than that of surface 26, so that collar 22 can be freely passed over the end of body 16 remote from head 24 until surface 44 engages sheet 14, as shown. The diameter of portion 48 is greater than that of portion 46, but more and more gradually so from the point of merger with portion 46 to the end of collar 22 remote from surface 44.

The diameter of surface 28 may be originally marginally smaller than that of surface 36 of ram 18, so that ram 18 can be driven into body 16 (ball 40 first) with a push or interference fit with surface 28 of body 16, until ball 40 engages dowel 20, as shown in FIG. 1.

Body 16, ram 18, dowel 20 and collar 22 may all be of aluminum alloys, but for proper functioning of the rivet, ram 18 should be harder than body 16 and dowel 20. Ram 18 may be of 75ST material, dowel 20 may be of 3S material and both body 16 and collar 22 may be of 17ST material.

Body 16, ram 18 and dowel 20 are pre-assembled as shown in FIG. 1 and as described above, and, virtue of the push or interference fit between body 16 and ram 18, all parts mentioned in this paragraph become in effect one part for handling purposes.

As shown, the assembly of body 16, ram 18 and dowel 20 is passed through the aligned holes through honeycomb 6 and member 8 until head 24 engages member 8 and the end of body 16 remote from head 24 extends past plate 14. Collar 22 is then placed over the end of body 16 containing dowel 20, as described above. The parts are now positioned as shown in FIG. 1. The axial length of cylindrical surface 26 of body 16 and the built-up thickness of honeycomb 6 and member 8 are so related that the plane of face sheet 14 passes through dowel 20 intermediate the ends thereof regardless of the built-up material thickness, within the tolerance limits thereof. Furthermore, regardless of the position of face sheet 14 relative to dowel 20, within the limits described above, the essential driving characteristics of the rivet will be unchanged.

To effect the desired connection between honeycomb 6 and element 8, an anvil (not shown) may be placed against the end of body 16 remote from head 24, and ram 18 is driven a predetermined distance further into body 16, as by striking ram head 38 with a hammer (not shown) to the position shown in FIG. 2, while collar 22 is held snugly against face sheet 14.

The driving action causes deformation of dowel 20 and the adjacent end of tubular body 16 until the end of the latter conforms to portion 48 of collar 22 and the air space around ball 40, including relief 42, is filled, substantially as shown in FIG. 2. During this action ball 40 enters axial space 34 through dowel 20. The result is a sure positive connection between honeycomb 6 and element 8 possessing high shear and high tensile strength without unsatisfactory deformation of honeycomb 6, regardless of what the built-up material thickness may be within the tolerance limits established therefor.

The driving action may be and as shown is accompanied by a deformation of frusto-conical surface 32 and surface 30 into relief 42, effected directly by the end of cylindrical portion 36 of ram 18 remote from ram head 38.

The length of body 16 should be such that before rivet 18 is driven, the recess of collar 22 (when the latter is in place, as shown in FIG. 1) is located about midway between the ends of dowel 20. If no collar is used the length of body 16 should, for the same built-up material thickness, be slightly less, so that the plane of face sheet 14 is located about midway between the ends of dowel 20.

FIG. 4 shows a collar 220 which is a modification of collar 22. Collar 220 is similar to collar 22 except that the hole through collar 220 is provided with conical and cylindrical portions 222 and 224, respectively, instead of the non-cylindrical portion 48 of collar 22. Collar 220 can be used interchangeably with collar 22.

In FIG. 5 there is shown a modification of the rivet comprising a tubular member 226 similar to tubular member 16, except that the inside diameter of member 226 is uniform throughout its length. Within member 226 at the end thereof remote from its head is a cylindrical metal plug 228. The rivet of FIG. 5 is driven in a manner similar to that in which the rivet of FIG. 1 is driven, except that with the FIG. 5 rivet, the driving is accomplished by means of a ram which does not tightly engage tubular member 226 and which is removed upon completion of the driving operation. The result is a connection not so strong as but lighter than the connection of FIG. 2.

From the above it will be seen that the invention is well suited to attain the enumerated objects and advantages and others not specifically mentioned.

Many details of the disclosed embodiments can be changed without departing from the scope of the invention. These details are therefore not to be taken as limitations upon the invention, except as those details may be specified in the claim.

What is claimed is:

An all-metal rivet comprising a circumferentially continuous one-piece tubular body defining an axis and having first and second ends and an axial bore therethrough from said first end to said second end and including a head portion at said first end and a shank portion between said head portion and said second end, said shank portion having an external cylindrical surface concentric with said axis, said body in said bore having first and second internal cylindrical surfaces concentric with said axis, said first surface extending from said head portion toward said second end and said second surface extending from said second end toward said head portion and of smaller diameter than said first surface, whereby a shoulder is formed between said first and second surfaces, a deformable tubular expansion dowel within said bore and located substantially entirely within said second surface, said dowel having an axial hole therethrough coinciding with said axis, and a rigid ram having a spherical actuating end, a cylindrical portion of larger diameter than said spherical end and of diameter substantially the same as said first surface and an external necked in circumferentially relieved portion between and joining said spherical end and said cylindrical portion and having a minimum diameter less than the diameter of said spherical end, said spherical end within said bore and positioned between said head portion and the end of said expansion dowel remote from said first end, said spherical end facing away from said head portion and said cylindrical ram portion extending outwardly of said body beyond said head portion, whereby said expansion dowel and said body are radially expansible by a force applied in a direction to drive said spherical end away from said first end and at the same time the end of asid cylindrical portion of said ram confronting said spherical end will deform said shoulder into said relieved portion.

References Cited in the file of this patent

UNITED STATES PATENTS

| | | |
|---|---|---|
| 647,357 | Baker | Apr. 10, 1900 |
| 1,646,431 | Tomkinson | Oct. 25, 1927 |
| 1,848,142 | Peirce | Mar. 8, 1932 |
| 1,921,794 | Tomkinson | Aug. 8, 1933 |
| 2,292,467 | Norsell | Aug. 11, 1942 |
| 2,314,445 | Du Vall | Mar. 23, 1943 |
| 2,358,578 | Keehn | Sept. 19, 1944 |
| 2,482,391 | Webster | Sept. 20, 1949 |
| 2,510,076 | Cockrell | June 6, 1950 |
| 2,555,420 | Richardson | June 5, 1951 |

FOREIGN PATENTS

| | | |
|---|---|---|
| 737,480 | Germany | July 15, 1943 |